(12) United States Patent
Shah

(10) Patent No.: US 10,366,431 B1
(45) Date of Patent: Jul. 30, 2019

(54) COMPUTER-READABLE MEDIUM, SYSTEM, AND METHOD FOR RESUMING SESSIONS ACROSS DEVICES

(71) Applicant: Amazon Technologies, Inc., Seattle, WA (US)

(72) Inventor: Nisarg Shah, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 563 days.

(21) Appl. No.: 14/713,197

(22) Filed: May 15, 2015

(51) Int. Cl.
*G06Q 30/00* (2012.01)
*G06Q 30/06* (2012.01)
*H04L 29/08* (2006.01)

(52) U.S. Cl.
CPC ....... *G06Q 30/0623* (2013.01); *H04L 67/141* (2013.01)

(58) Field of Classification Search
CPC .................................. G06Q 30/0601–0645
USPC ............................................... 705/26.1–27.2
See application file for complete search history.

(56) References Cited

U.S. PATENT DOCUMENTS

| 2005/0203882 | A1* | 9/2005 | Godley | ............. | G06F 17/30887 |
| 2007/0100824 | A1* | 5/2007 | Richardson | ....... | G06F 17/30864 |
| 2008/0289029 | A1* | 11/2008 | Kim | ................... | G06F 17/30905 726/12 |
| 2009/0077071 | A1* | 3/2009 | Mishkanian | ........ | G06F 17/3064 |
| 2012/0331409 | A1* | 12/2012 | Olliphant | .......... | G06F 17/30905 715/760 |
| 2014/0113685 | A1* | 4/2014 | Lee | ......................... | H04W 8/22 455/566 |
| 2014/0149236 | A1* | 5/2014 | Argue | ................ | G06Q 20/3276 705/16 |
| 2014/0189519 | A1* | 7/2014 | Powell | .................... | H04L 67/22 715/736 |

OTHER PUBLICATIONS

Alapetite, A. (2010). Dynamic 2D-barcodes for multi-device web session migration including mobile phones. Personal and Ubiquitous Computing, 14(1), 45-52. doi:http://dx.doi.org/10.1007/s00779-009-0228-5 (Year: 2010).*

* cited by examiner

*Primary Examiner* — Brittney N Miller
*Assistant Examiner* — Arielle E Weiner
(74) *Attorney, Agent, or Firm* — Thomas | Horstemeyer, LLP

(57) ABSTRACT

Disclosed are various embodiments for resuming sessions and electronic commerce session across devices. A computing environment is employed to maintain a navigation history comprising a plurality of product pages accessed by a first client device during an electronic commerce session. At least one of the plurality of product pages is determined to be presented on the second client device in response to a request to resume the electronic commerce session being received from a second client device. The product page determined is presented on the second client device.

20 Claims, 7 Drawing Sheets

COMPUTER-READABLE MEDIUM, SYSTEM, AND METHOD FOR RESUMING SESSIONS ACROSS DEVICES

BACKGROUND

Users may navigate through or interact with electronic commerce applications to view product pages for items or services that the users might purchase, rent, download, or otherwise consume. Users may view the same product page for a particular item numerous times before making a purchase, requiring the users to navigate to the product page for the particular item multiple times. As electronic commerce applications have extensive item catalogs, finding the same product page can prove difficult.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to resuming sessions across devices. As noted above, users may navigate through or interact with electronic commerce applications to view pages for items or services that the users might purchase, rent, download, or otherwise consume. Users may view the same product page for a particular item numerous times before making a purchase, requiring the users to navigate to the product page for the particular item multiple times. As electronic commerce applications have extensive item catalogs, finding the same product page can prove difficult.

According to various embodiments, a computing environment is employed to maintain a navigation history for a user in association with a user account. The navigation history may comprise pages, such as product pages or application screens, accessed by a first client device during an electronic commerce session. A resume component may be provided to resume the electronic commerce session on another device. In various embodiments, a single event, such as a single mouse click, touch screen gesture, or other similar action, may cause the electronic commerce session to be resumed on another device.

To resume the electronic commerce session, at least one of the pages visited by the user during the previous session is identified to be presented on a second client device. In various embodiments, the pages are determined based at least in part on relevancy metrics generated for individual product pages. In some embodiments, the pages are determined based at least in part on a time at which the pages were accessed.

A resume component may be generated on devices associated with a same user who performed the previous electronic commerce session. The resume component may provide a single-click or single-touch option for users of an electronic commerce application to return to an exact location visited during their last session with the electronic commerce application. As a result, users may not be required to navigate through the electronic commerce application to hunt down a particular page when switching to other devices. In the following discussion, a general description of the system and its components is provided, followed by a discussion of the operation of the same.

Figure 1:
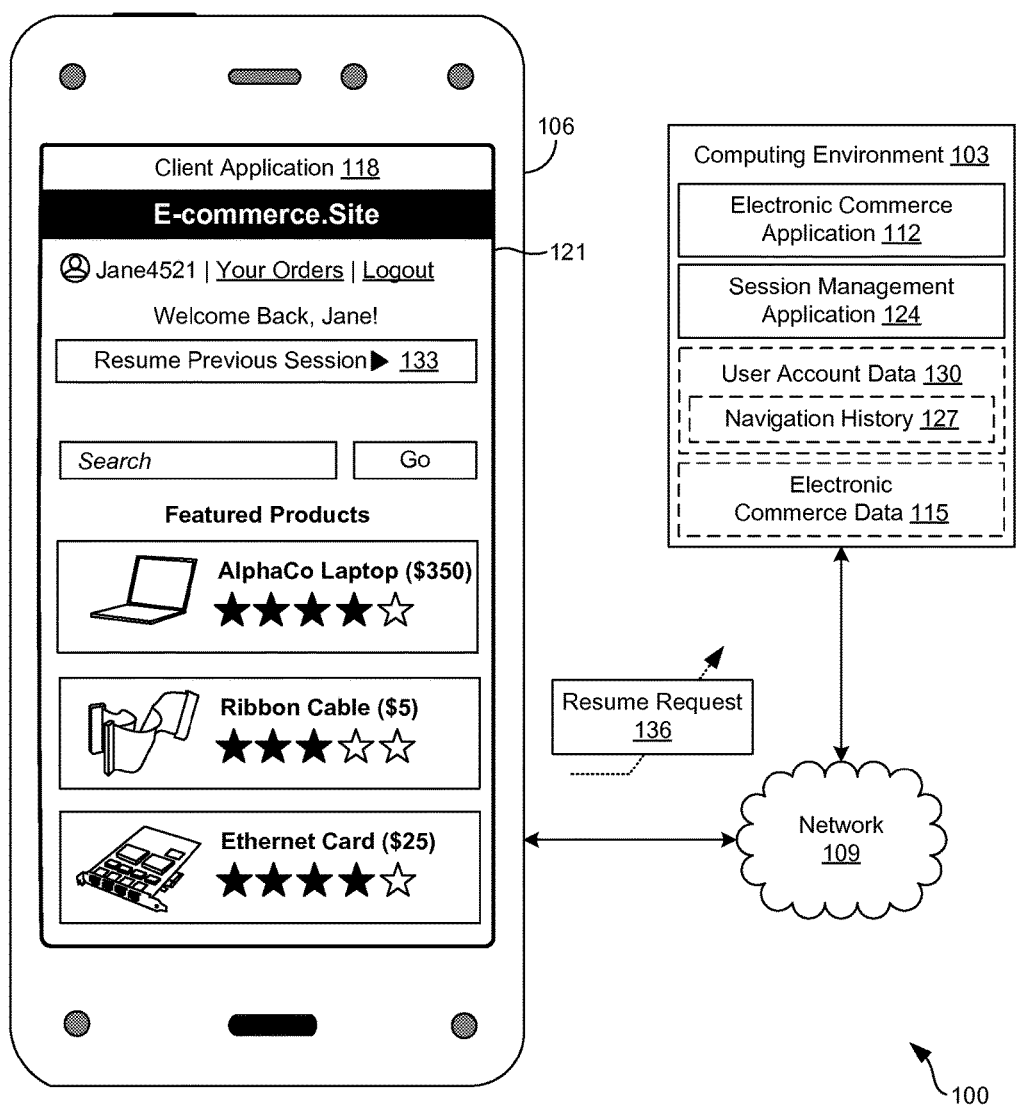
FIG. 1 is a drawing of a networked environment according to various embodiments of the present disclosure.

With reference to FIG. 1, shown is a networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Various applications and/or other functionality may be executed in the computing environment 103 according to various embodiments. In the non-limiting example of FIG. 1, the computing environment 103 comprises an electronic commerce application 112. As may be appreciated, a user employs the client device 106 to access content generated by the electronic commerce application 112. For example, the user navigates through pages generated by the electronic commerce application 112 to browse, purchase, lease, rent, or otherwise consume items offered by the electronic commerce application 112. To this end, the electronic commerce application 112 uses electronic commerce data 115 to present information associated with items available for sale, purchase, lease, rent, download, or other suitable form of consumption. A client application 118 executable on the client device 106 renders the content generated by the electronic commerce application 112 in a display 121.

Additionally, in the example of FIG. 1, the computing environment 103 comprises a session management application 124. According to various embodiments, the session management application 124 maintains a navigation history 127 in user account data 130. In various embodiments, the navigation history 127 comprises individual pages accessed by a user on a first client device during a period of time that the user is interacting with the electronic commerce application 112. The activity performed by the user during the period of time may be referred to as an electronic commerce session.

In various embodiments, the electronic commerce application 112 may generate a resume component 133 (e.g., a button, a link, or another suitable user interface component) that allows a user to select or otherwise manipulate the resume component 133 in order to resume a previous electronic commerce session started by a user. By manipulating the resume component 133, a resume request 136 may be communicated to the computing environment 103 over the network 109 for access by the session management application 124 and/or the electronic commerce application 112.

A receipt of the resume request 136 may cause the session management application 124 to identify a relevant page to present to the user on the client device 106. For example, the session management application 124 may identify the last product page visited by the user in a previous electronic commerce session and cause the product page to be presented to the user so that the user can resume his or her previous session.

In various embodiments, the resume request 136 may be communicated to the computing environment 103 based on a single event performed on the client device 106. For example, a single manipulation of the resume component 133 made by the user may cause the client application 118 to generate and send the resume request 136. Assuming the client device 106 has a touch-screen display, the user may perform a single touch gesture on the resume component 133 to resume a previous electronic commerce session. If the client device 106 does not have a touch-screen display, the user may perform a single mouse click, keystroke, or other suitable input in association with the resume component 133 to resume the previous electronic commerce session. Accordingly, the resume component 133 provides a single-click or single-touch option for users of an electronic commerce application 112 to go back to an exact location during a previous session in the electronic commerce application 112. Users may not be required to navigate through the electronic commerce application 112 to return to a page for an item of interest, even when using other devices.

Figure 2:
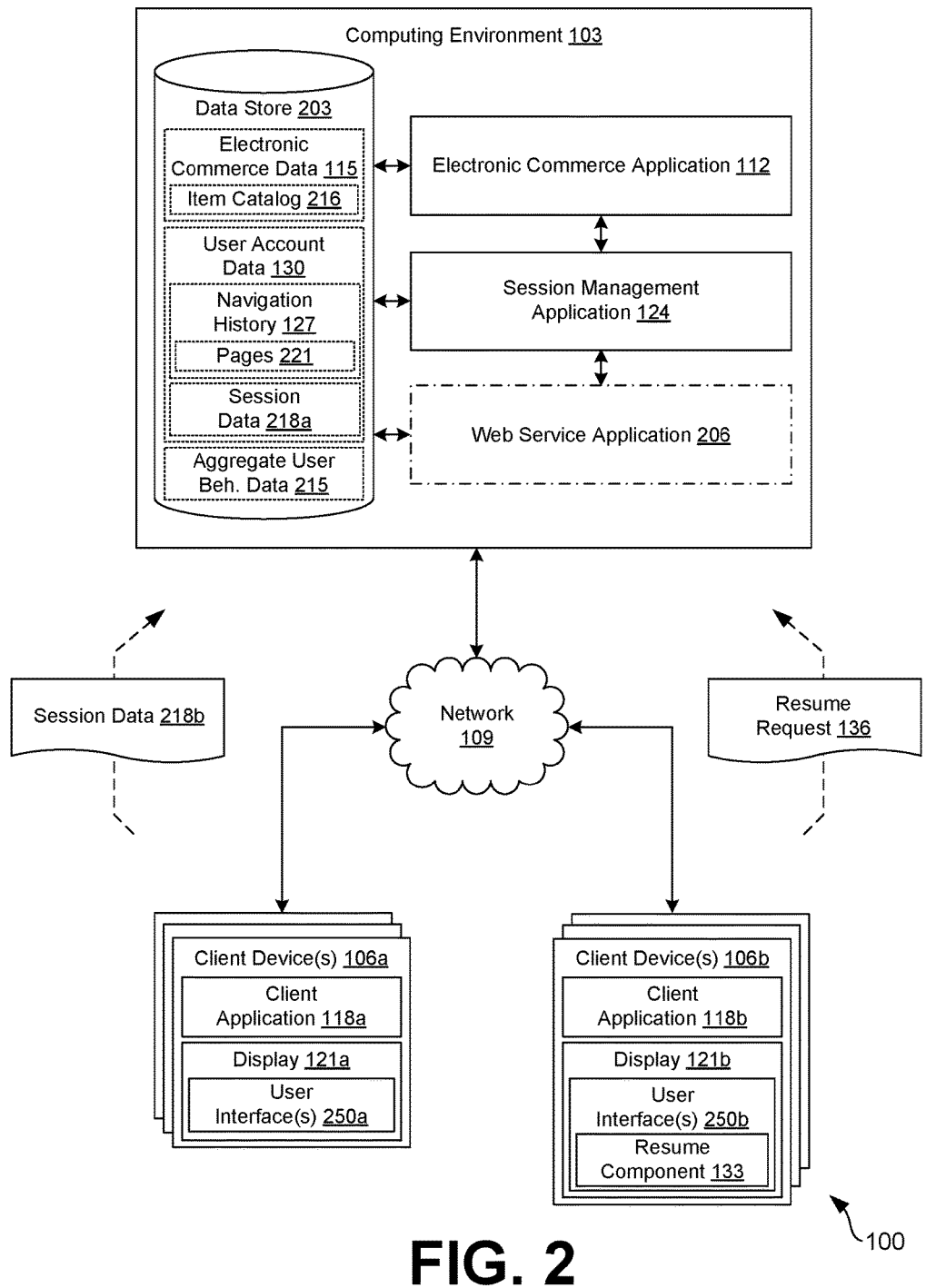
FIG. 2 is another drawing of the networked environment of FIG. 1 according to various embodiments of the present disclosure.

With reference to FIG. 2, shown is another drawing of the networked environment 100 according to various embodiments. The networked environment 100 includes a computing environment 103, a first client device 106a, and second client device 106b, which are in data communication with each other via a network 109.

The computing environment 103 may comprise, for example, a server computer or any other system providing computing capability. Alternatively, the computing environment 103 may employ a plurality of computing devices that may be arranged, for example, in one or more server banks, computer banks, or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 203 that is accessible to the computing environment 103. The data store 203 may be representative of a plurality of data stores 203 as can be appreciated. The data stored in the data store 203, for example, is associated with the operation of the various applications and/or functional entities described below.

The components executed on the computing environment 103, for example, include the electronic commerce application 112, the session management application 124, a web service application 206, and other applications, services, processes, systems, engines, or functionality not discussed in detail herein.

The electronic commerce application 112 is executed in order to facilitate the online purchase of items over the network 109. The electronic commerce application 112 also performs various backend functions associated with the online presence of a merchant in order to facilitate the online purchase of items. For example, the electronic commerce application 112 generates network pages, such as web pages or other types of network content, that are provided to the client devices 106 for the purposes of selecting items for purchase, rental, download, lease, or other form of consumption as will be described.

The session management application 124 is executed to maintain navigation histories 127 generated by users as they traverse content generated by the electronic commerce application 112. Additionally, the session management application 124 is executed to facilitate resuming an electronic commerce session on a same or different client device 106. To this end, the session management application 124 identifies a most relevant page in a previously conducted electronic commerce session and causes the electronic commerce application 112 to present content associated with the most relevant page.

The web service application 206 is executed to provide a medium for communication between the computing environment 103 and the client devices 106 over the network 109. The web service application 206 may comprise a web-based application programming interface (API) embodied in software that facilitates programmatic service calls (e.g., API calls) made by the client application 106 to communicate with the components of the computing environment 103, such as the electronic commerce application 112, the session management application 124, and/or other services or applications not described herein. According to various embodiments, the web-based API may further comprise a representational state transfer (REST) API, a simple object access protocol (SOAP) API, a hypertext transfer protocol (HTTP) API, or another suitable API.

The data stored in the data store 203 includes, for example, electronic commerce data 115, user account data 130, aggregate user behavior data 215, and potentially other data. The electronic commerce data 115 includes an item catalog 216 having information associated with products, goods, services, downloads, and so on, that may be offered for order by one or more merchants by way of the electronic commerce application 112. The information associated with each of the items may include a name, description, price, genre, subgenre, categories, images, videos, tax categories, options, shipping categories, and so on. The electronic commerce application 112 may access the electronic commerce data 115 when serving up network content to the client devices 106.

The user account data 130 includes data for the authentication of users of the electronic commerce application 112 and/or the other components of the computing environment 103. Further, the user account data 130 includes the navigation history 127 and session data 218a. The navigation history 127 includes pages 221 accessed by the user during an electronic commerce session. The pages 221 may include product pages, search results, category pages, or other pages generated by the electronic commerce application 112 during an electronic commerce session. While pages 221 may include network pages, pages 221 may also include particular application screens rendered by the client application 118a. In some embodiments, a sequence in which the pages 221 were accessed in the previous electronic commerce session may be included in the navigation history 127.

Further, the user account data 130 may include session data 218a describing user interaction with the electronic commerce application 112 in the navigation history 127. For example, the client application 118a on the first client device 106a and/or the electronic commerce application 112 may collect information associated with the user's interactions while navigating the pages 221 during an electronic commerce session. The session data 218a may include an amount of time a page 221 was accessed, an indication of whether the user added an item associated with the page 221 to a virtual shopping cart or virtual wish list, whether the user purchased or otherwise consumed the item on the page 221, whether the user accessed comments or product specifications, and/or other measurable interactions. In addition, the user account data 130 may include a browsing history and/or a purchase history associated with a user.

The aggregate user behavior data 215 may include metrics or other data that describes an aggregate of user behavior describing interactions with the electronic commerce application 112 performed by a multitude of users. Metrics may include, for example, an average time a user spends on a page 221 before purchasing an item corresponding to the page 221, a number of visits to the page 221 before purchasing the item, etc.

The first client device 106a and the second client device 106b (collectively client devices 106) are representative of a plurality of client devices 106 that may be coupled to the network 109. The client devices 106 may comprise, for example, processor-based systems, such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client devices 106 may include displays 121a-121b. The displays 121a-121b may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client devices 106 may be configured to execute various applications such as client applications 118a-118b and/or other applications. The client applications 118a-118b may be executed in the client devices 106, for example, to access network content served up by the computing environment 103 and/or other servers, thereby rendering user interfaces 250a-250b on the displays 121a-121b. To this end, the client applications 118a-118b may comprise, for example, a browser, a dedicated application, etc., and the user interfaces 250a-250b may comprise network pages, application screens, etc. The client devices 106 may be configured to execute applications beyond the client applications 118a-118b such as, for example, email applications, social networking applications, word processors, spreadsheets, and/or other applications.

Next, a general description of the operation of the various components of the networked environment 100 is provided. To begin, it is appreciated that a user may have access to multiple client devices 106 capable of retrieving and navigating content served up by the electronic commerce application 112. For example, a user may navigate to a particular page 221 in the electronic commerce application 112 using a first client device 106a during an electronic commerce session. The user may desire to reconvene the same electronic commerce session on the second client device 106b at a later time. Traditionally, to regain access to a page 221 that was previously accessed during the electronic commerce session on a different device, the user is required re-navigate to the page 221 by performing searches, dialing down nodes in an item taxonomy, etc.

Accordingly, the session management application 124 may be configured to receive various session data 218b describing a user's interaction with the electronic commerce application 112 on the first client device 106a. The session management application 124 uses the session data 218b (stored in the data store 203 as session data 218a) collected from the first client device 106a to maintain a navigation history 127 in association with a user account in the data store 203. In various embodiments, the navigation history 127 comprises pages 221 accessed by a user on the first client device 106a during an electronic commerce session, whereby the user traverses pages 221 (e.g., product pages for items) generated by the electronic commerce application 112. In some embodiments, an identifier for the pages 221 accessed by the user (e.g., uniform resource locator (URL) or a unique identifier) is stored in the data store 203 as user account data 130 such that the pages 221 accessed by the user during a particular session can be queried or otherwise accessed by the session management application 124 at a later time.

Once the session management application 124 has collected information associated with at least one electronic commerce session performed on the first client device 106a, a resume component 133 may be generated in subsequent pages 221 or application screens generated for the user account regardless of which client device 106 accesses the page 221. For example, the resume component 133 may be generated for inclusion in pages 221 generated by the electronic commerce application 112 for display on the second client device 106b if the user logs in under a same user account for which the electronic commerce session was performed. In some embodiments, the resume component 133 may be encoded for rendering in a suitable portion of a page 221 generated by the electronic commerce application 112 such that, when the resume component 133 is selected by a user, a resume request 136 is generated and communicated to the computing environment 103 over the network 109.

The resume request 136 may be accessed by the session management application 124 to identify or determine at least one page 221 or other point in a previous electronic commerce session to provide to the user so that the user can continue his or her electronic commerce session on the second client device 106b. In various embodiments, the page 221 provided to the user on the second client device 106b is determined based at least in part on a time at which the page 221 was accessed in the previous electronic commerce session. For example, the last page 221 the user visited in the previous electronic commerce session may be identified and presented to the user on the second client device 106b to resume its session.

In some embodiments, an amount of time that the user visited a particular page 221 in the previous electronic commerce session may be used to identify a most relevant page 221 to present to the user. For example, if a user spent less than a minute on a first product page 221a for a laptop device and twenty minutes on a second product page 221b for a same or similar laptop device, the second product page 221b may be identified as being the most relevant, as it would appear the user has taken a greater interest in the second product page 221b. Accordingly, in various embodiments, a metric describing a likelihood that the particular page 221 is still relevant to the user may be generated for individual pages 221 accessed in the previous electronic commerce session. The metrics generated for the individual pages 221 may be employed by the session management application 124 to identify a most relevant page 221 to present to users when resuming their electronic commerce sessions.

As may be appreciated, information used in generating content or pages 221 by the electronic commerce application 112 may change frequently. For example, the price of an item, a quantity of the item available, particular features of an item, descriptions of the items, customer reviews, or other information, may change daily. The session management application 124 may determine whether any content on a previously visited page 221 has changed since the user last visited the page 221. If the content has changed, an indicator may be generated for inclusion in the page 221 to notify a user that the page 221 has changed since its previous session. In various embodiments, the indicator may be an image, a label, or other identifier for inclusion in the page 221. In some embodiments, the indicator may specify which particular content has changed. For example, the indicator may notify the user that the price of the item has increased or decreased. In another example, the indicator may notify the user that a metric (e.g., star rating) associated with an average customer review has increased or decreased.

The session management application 124 causes the page 221 to be presented on the second client device 106b or other suitable device that generated the resume request 136. Causing the page 221 to be presented on the second client device 106b may include causing the electronic commerce application 112 to serve up content or a page 221 identified by the session management application 124 in the client application 118b executable on the second client device 106b.

Figure 3:
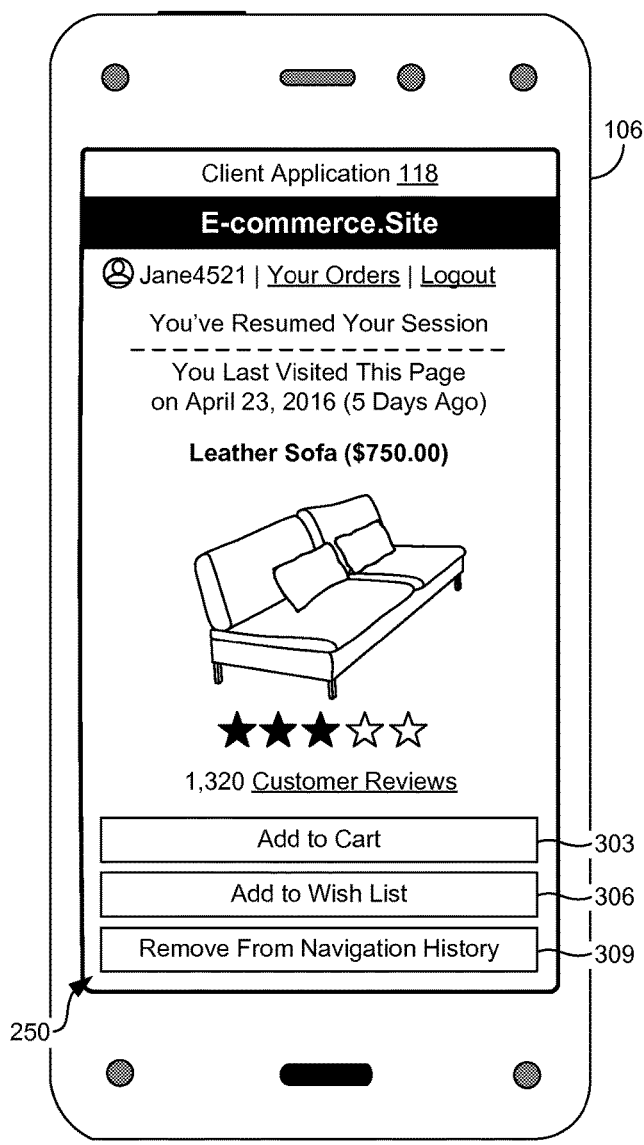
FIG. 3 is a drawing of a client device executing a client application according to various embodiments of the present disclosure.

Referring next to FIG. 3, shown is a non-limiting example of a page 221 generated by the electronic commerce application 112 (FIG. 1) for display on a client device 106. As shown in FIG. 3, a user (e.g., "Jane4521") accesses a product page 221 for a "Leather Sofa." The user may select or otherwise manipulate the "add to cart" component 303 to add the item to a virtual shopping cart or the user may select or otherwise manipulate the "add to wish list" component 306 to add the item to a virtual wish list.

The client application 118 and/or the session management application 124 (FIG. 1) may measure session data 218 (FIG. 2) that describes the user's interaction with the user interface 250. For example, an amount of time the user remains on the page 221 can be measured. Similarly, whether the person scrolled to a portion of the page having product specifications or customer reviews may be identified. The session data 218 may be used in identifying which page 221 of a plurality of pages 221 is most relevant to present to a user at a later time when the user resumes its session.

In various embodiments, the user may assist the session management application 124 in determining whether a particular page 221 is relevant in the future for presenting the page to the user when resuming a session on the same or different device. For example, the user may select or otherwise manipulate the "remove from navigation history" component 309 that directs the session management application 124 to remove the page 221 from the navigation history 127, such that the page 221 will not be considered for presentation to the user if the user desires to resume the session at another time.

Figure 4:
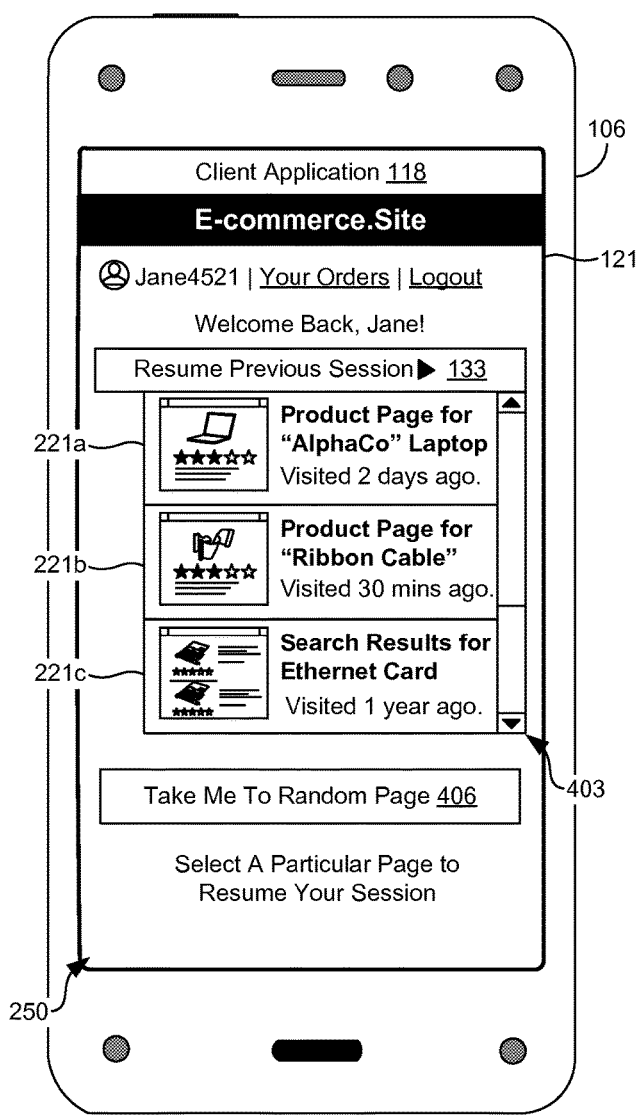
FIG. 4 is a drawing of a client device executing a client application according to various embodiments of the present disclosure.

Turning now to FIG. 4, shown is another example of the resume component 133 according to various embodiments. In the non-limiting example of FIG. 4, a user may manipulate the resume component 133 to select a particular one of the pages 221a . . . 221c (collectively pages 221) in the navigation history 127 (FIG. 1). Accordingly, a list 403 of the pages 221 in the navigation history 127 may be generated for the user to select at which page 221 the electronic commerce session is resumed. In various embodiments, the list of pages 221 may be sorted based on the metric generated for the individual ones of the pages 221, where the most relevant pages 221 are presented at the top of the list 403 and less relevant pages 221 are presented at the bottom of the list 403. In alternative embodiments, the list of pages 221 may be sorted based on an amount of time that the user visited the respective pages 221.

In various embodiments, information associated with a particular page 221 may be shown. For example, a screen capture of the page 221 may be shown as well as a length of time the user visited the particular one of the pages 221. In some embodiments, the user may select or otherwise manipulate a "random page" component 406 that will take the user to psuedorandomly-selected pages 221.

Figure 5:
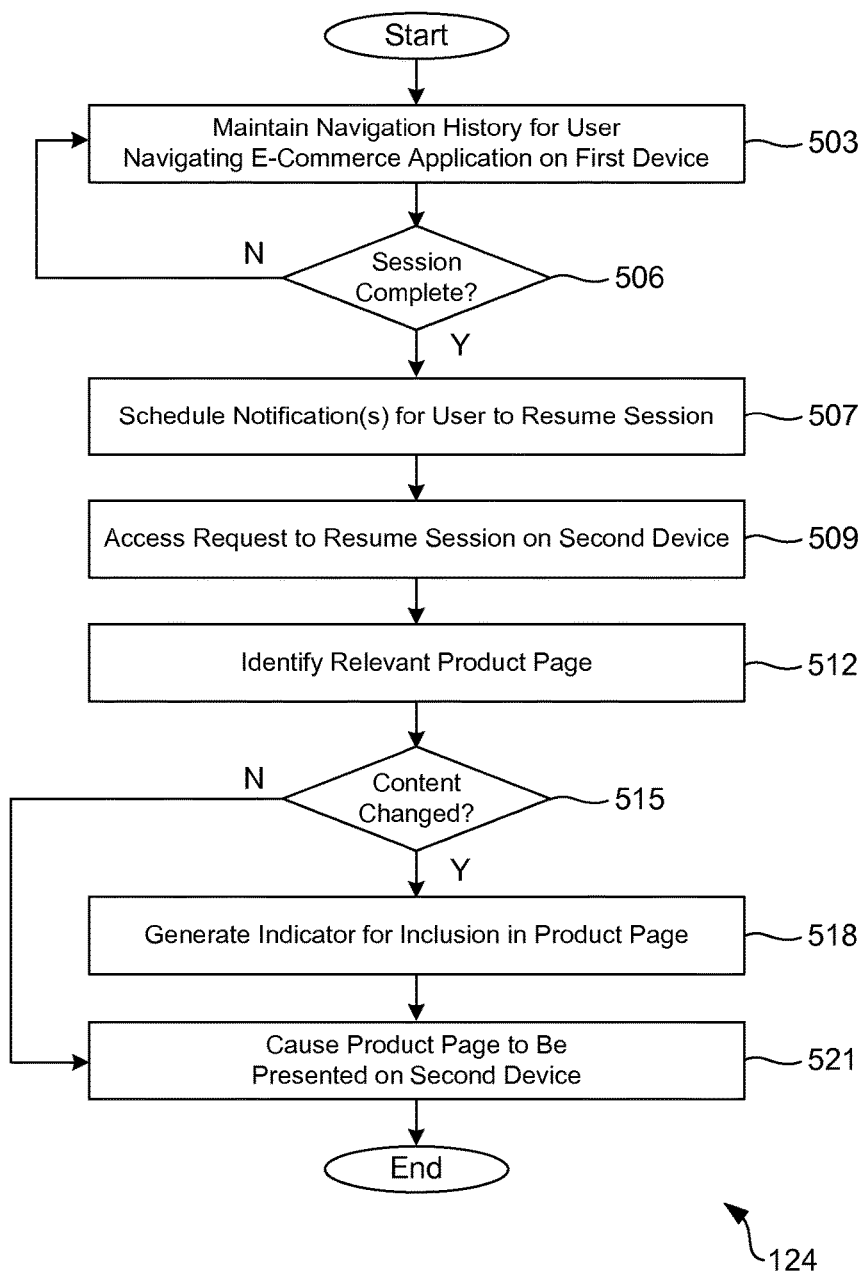
FIG. 5 is a flowchart illustrating one example of functionality implemented as portions of a session management application executed in a computing environment in the networked environment of FIG. 1 according to various embodiments of the present disclosure.

Moving on to FIG. 5, shown is a flowchart that provides one example of the operation of a portion of the session management application 124 according to various embodiments. It is understood that the flowchart of FIG. 5 provides merely an example of the many different types of functional arrangements that may be employed to implement the operation of the portion of the session management application 124 as described herein. As an alternative, the flowchart of FIG. 5 may be viewed as depicting an example of elements of a method implemented in the computing environment 103 (FIG. 1) according to one or more embodiments.

As may be appreciated, a user may have a multitude of devices on which the user is capable of traversing content generated by the electronic commerce application 112. For example, a user may navigate pages 221 generated by the electronic commerce application 112 using a laptop, a tablet, a mobile device, or another suitable electronic device. If the user desires to return to a particular page 221 generated by the electronic commerce application 112, the user may be required to re-navigate to the product page 221 by performing searches, dialing down nodes on an item taxonomy, etc.

A resume component 133 may be provided in a suitable portion of a page 221 generated by the electronic commerce application 112 that, when selected by a user, resumes a previous electronic commerce session across a multitude of devices. Beginning with 503, the computing environment 103 maintains a navigation history in association with a user account in the data store 203. In various embodiments, the navigation history 127 comprises pages 221 accessed by user on a first client device during an electronic commerce session where the user navigates pages 221 (e.g., product pages for items) generated by the electronic commerce application 112. In some embodiments, an identifier (e.g., URL or a unique identifier) for the pages accessed by the user are stored in the data store 203 in association with the electronic commerce session such that all pages accessed by the user during a particular session can be easily queried or otherwise accessed by the session management application 124 at a later time.

In 506, a determination is made whether the electronic commerce session is complete. In various embodiments, the determination may be made based on a lapse of a predefined amount of time, whether the user has signed out of the electronic commerce application 112, whether the user has terminated execution of the client application 118, etc. If the electronic commerce session is not complete, the process may revert to 503 to continue maintaining the navigation history 127 for the user.

Next, in 507, a notification may be scheduled to be presented to the user at a predefined time to remind a user to resume the previous electronic commerce session. In various embodiments, the notification includes a short message service (SMS) notification, an e-mail notification, a push notification, a dialog notification for display on the client device 106, and/or any other suitable notification. In various embodiments, the notification features one or more of the product pages or the items associated with the product pages. The product pages and/or items included in the notification may be determined based at least in part on their relevancy, as will be discussed in 512. In various embodiments, the predefined time at which the notification is communicated to the user may be defined by the user, an administrator, or generated psuedorandomly.

Next, in 509, a request to resume (e.g., resume request 136) a previous electronic commerce session is accessed by the session management application 124. In various embodiments, the request is communicated from a second client device 106b to the computing environment 103 in response to a selection or other manipulation of the resume component 133. In some embodiments, the request may specify a particular page 221 or other point in the electronic commerce session where the user desires to return. The request may be sent based on a single event, such as a single manipulation of the resume component 133 made by the user. For example, the user may perform a single click of a mouse or a single touch gesture on resume component 133 presented on the client device to resume a previous electronic commerce session. As a result, the resume component 133 provides a single-click or single-touch option for users of an electronic commerce application 112 to go back to an exact location during a previous session in the electronic commerce application 112. Users are not required to navigate through the electronic commerce application 112 to return to a page 221 of interest, even when using other devices.

In 512, the session management application identifies or determines a relevant page 221 or other point in a previously stored electronic commerce session from a multitude of pages 221 in a given user's navigation history 127. As may be appreciated, the page 221 or other point in the electronic commerce session may be the page 221 presented to the user on the second client device. Accordingly, the relevant page 221 may be distinguished from other pages 221 in the navigation history 127 based on a multitude of factors.

In various embodiments, the page 221 is determined based at least in part on a time the page 221 was accessed in the previous electronic commerce session. For example, the last page 221 the user visited may be identified to be presented to the user to resume its session. Alternatively, the first page 221 the user visited in the previous electronic commerce session may be identified to be presented to the user.

In some embodiments, an amount of time the user visited a particular one of the pages 221 in the previous electronic commerce session may be used to identify a most relevant page 221 to present to the user. For example, if a user spent less than a minute on a first product page 221 for a television and fifteen minutes on a second product page 221 for a same or similar television, the second product page 221 may be identified as being the most relevant. It would appear the user has taken a greater interest in the second product page because more time was spent on the second product page 221. In various embodiments, a metric (e.g., a relevancy metric) may be generated for individual pages 221 in an electronic commerce session to identify a most relevant page 221, which will be discussed in greater detail below with respect to FIG. 6.

As may be appreciated, information used in generating a page 221 or other content by the electronic commerce application 112 may change frequently. For example, the price of an item, a quantity of the item available, particular features of an item, descriptions of the items, customer reviews, or other information, may change from day to day in the item catalog 216. As a product page has been identified in 512, in 515, it may be determined whether any content on the page 221 has changed since the user last accessed the particular page 221.

If the content has changed, the process proceeds to 518 where an indicator may be generated to notify a user that the page 221 has changed. The indicator may comprise an image, a label, or other identifier for inclusion in the page 221. In some embodiments, the indicator may specify what particular content has changed. For example, the indicator may notify the user that the price of the item has increased or decreased. In another example, the indicator may notify the user that a metric (e.g., star rating) associated with an average customer review has increased or decreased. The process then proceeds to 521.

Returning to 515, if the content of the page 221 has not changed, the process may bypass 518 to proceed directly to 521. In 521, the session management application 124 causes the page 221 to be presented on the second client device 106b or other device requesting to resume the previous electronic commerce session. This may include causing the electronic commerce application 112 to serve up the product page identified in 512 in a web browser application or other type of client application 118 executable on the second client device 106.

Figure 6:
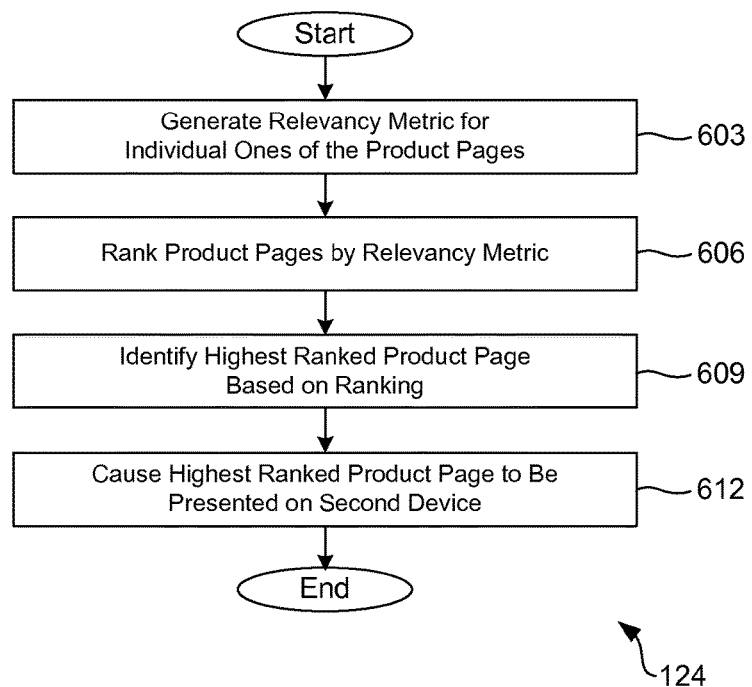
FIG. 6 is a flowchart illustrating one example of functionality implemented as portions of a session management application executed in a computing environment in the networked environment of FIG. 1 according to various embodiments of the present disclosure.

Referring next to FIG. 6, shown is a flowchart that provides one example of the operation of another portion of the session management application 124 according to various embodiments. It is understood that the flowchart of FIG. 6 provides merely an example of the many different types of functional arrangements that may be employed to implement the operation of the portion of the session management application 124 as described herein. As an alternative, the flowchart of FIG. 6 may be viewed as depicting an example of elements of a method implemented in the computing environment 103 (FIG. 1) according to one or more embodiments.

As noted above, a metric (e.g., a relevancy metric) may be generated for individual product pages in an electronic commerce session to identify a most relevant product page. To this end, the electronic commerce application 112 can perform an automated attempt to identify an item that the user is most likely to purchase or otherwise consume. As a request has been received to resume a previous electronic commerce session, the session management application 124 identifies the product pages accessed by the user in the previous electronic commerce session. Beginning with 603, a relevancy metric is generated for individual ones of the product pages in the previous electronic commerce session.

In various embodiments, the relevant metric is generated based on a variety of factors and may be calculated as a function of weighted factors expressed as:

$$M = w_1 f_1 + w_2 f_2 + \ldots + w_n f_n \qquad \text{(eq. 1)},$$

where M is the metric, $f_n$ is a value for a given factor, and $w_n$ is a predefined weight assigned the factor. In one example, a higher weight can be assigned to a factor being more indicative of whether the user is likely to purchase the item. For example, the amount of time spent on a particular product page (e.g., collected by the client device 106 using a timer) may be more indicative of whether or not a user desires to purchase an item, as opposed to whether the product page was the last page visited by the user. Accordingly, the amount of time the user was on the particular product page may be assigned a higher weight than whether the product page was the last page visited by the user.

In another example, a factor for consideration may include whether the item associated with the product page has been purchased by the user. For example, if the user purchased the item, the particular product page may have a low relevance for future access. Accordingly, a high weight may be associated with the factor as it is highly indicative of whether a page is relevant when resuming an electronic commerce session.

In various embodiments, the factors include an amount of time the product page was accessed in the previous electronic commerce session, a number of times the product page was accessed in previous electronic commerce sessions, whether the product page was the first page accessed by the user in the previous electronic commerce session, whether the product page was the last page accessed by the user in the previous electronic commerce session, whether the user manipulated portions of the product page (e.g., accessed product specifications, customer reviews), whether the user added an item associated with the product page to a virtual shopping cart or virtual wish list, whether the user purchased or otherwise consumed the item on the product page, the order of access, and/or other factors.

Another factor may include a category of the item on the product page relative to categories of other items having product pages accessed in a previous electronic commerce session. For example, if a user accessed a product page for a bottle of toothpaste and a product page for a television, a category of the bottle of toothpaste (e.g., home supplies) may be compared to a category of the television (e.g., electronics) to determine which product page is more relevant. As the electronic category is likely more relevant to the user, the product page for the television may be selected to present to the user.

In some embodiments, a factor may include whether an item viewed in the previous electronic commerce session is capable of being purchased on the client device 106 used to resume the electronic commerce session. For example, mobile phones or tablet computing devices may have access to particular digital content that may not be available on a laptop computing device. If the item cannot be purchased, leased, or otherwise consumed on the client device 106 resuming the session, the product page for the item may have low relevance. In some embodiments, the product page for the item may be removed completely for consideration before metrics for other products pages are determined.

In various embodiments, a behavior of the user during the electronic commerce session may be compared to the aggregate user behavior data 215 to generate a metric describing a likelihood that the user may purchase at least one of the items associated with the product pages. For example, if the behavior of the user is indicative that the user is likely to purchase, download, or otherwise consume an item, based on a comparison of the behavior of the user to the aggregate user behavior data 215, then the product page for the item most likely to be purchased may be calculated as the most relevant.

Next, in 606, the product pages may be ranked based at least in part on their respective metric calculated in 603. For example, the product pages may be ranked from a highest to lowest or vice versa. As the product pages have been ranked, in 609, a highest ranked product page may be identified based at least in part on their ranking. In 612, the session management application 124 may cause the product page identified in 609 (e.g., the highest ranked) to be presented on the second client device or other suitable client device. This may include causing the electronic commerce application 112 to serve up the product page identified in 512 in a web browser application or other type of client application 118 executable on the second client device 106.

Figure 7:
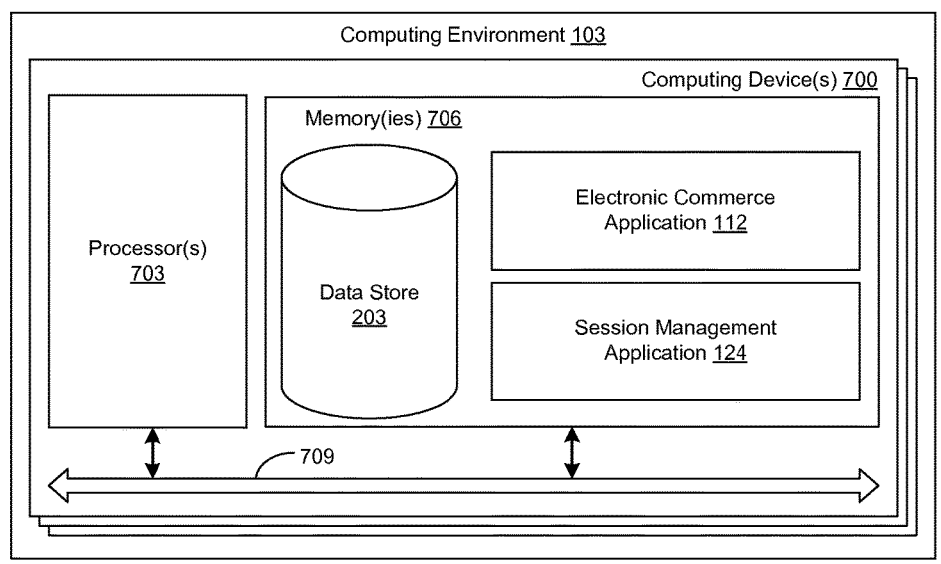
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the session management application 124, the electronic commerce application 112, and potentially other applications. Also stored in the memory 706 may be a data store 203 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the session management application 124, the electronic commerce application 112, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the session management application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the session management application 124 and the electronic commerce application 112, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the session management application 124 and the electronic commerce application 112, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program for programmatically identifying a most-relevant product page from a past electronic commerce session to facilitate a return to the most-relevant product page on another device, the program being executable in at least one computing device and comprising program code that, when executed in the at least one computing device, causes the at least one computing device to:
   maintain a navigation history in association with a user account in a memory, the navigation history comprising a plurality of product pages of a network site accessed by a first client device associated with the user account during a first electronic commerce session;
   after a completion of the first electronic commerce session, detect that a second client device associated with the user account is accessing the network site during a second electronic commerce session;
   determine one of the plurality of product pages accessed by the first client device during the first electronic commerce session to be presented on the second client device in response to a request to resume the electronic commerce session being received from the second client device, the one of the plurality of product pages being determined based at least in part on a ranking of a relevancy metric generated for individual ones of the plurality of products pages, wherein the relevancy metric is generated as a function of a plurality of factors and a plurality of weights corresponding to each of the plurality of factors, wherein at least a portion of the factors comprises:
      an amount of time spent on a respective one of the plurality of product pages;
      a purchase or a lack of purchase made of an item through the respective one of the plurality of product pages;
      a category of the item shown in the respective one of the plurality of product pages relative to categories of other items having product pages accessed in the first electronic commerce session; and
      a manipulation or a lack of manipulation of at least one portion of the respective one of the plurality of product pages during the first electronic commerce session;
   generate a resume session component to communicate to the second client device for inclusion in a user interface accessed during the second electronic commerce session, the resume session component comprising information associated with only the one of the plurality of product pages determined, and the resume session component being configured to, when manipulated using a single input gesture, resume the first electronic commerce session by presenting the one of the plurality of product pages;
   detect that the single input gesture was made on the second client device in association with the resume session component; and
   in response to the single input gesture being detected on the second client device in association with the resume session component, cause the one of the plurality of product pages to be presented on the second client device.

2. The non-transitory computer-readable medium of claim 1, further comprising program code that, when executed in the at least one computing device, causes the at least one computing device to maintain an identifier associated with each of the plurality of product pages accessed during the first electronic commerce session in a data store.

3. The non-transitory computer-readable medium of claim 1, wherein the single input gesture is a single touch or a single click performed on the second client device.

4. A system for programmatically identifying a most-relevant network page from a past network site session to facilitate a return to the most-relevant network page on another device, comprising:
   at least one computing device comprising memory; and
   program instructions stored in the memory and executable in the at least one computing device that, when executed, cause the at least one computing device to:
      maintain a navigation history in association with a user account in a memory, the navigation history comprising a plurality of pages of a network site accessed by a first client device associated with the user account during a first session on the network site;
      after a completion of the first session, detect that a second client device associated with the user account is accessing the network site during a second session;
      generate a resume session component to communicate to the second client device for inclusion in at least one user interface accessed during the second session, the resume session component being configured to, when manipulated using a single selection, resume the first session by presenting one of the plurality of pages;
      determine the one of the plurality of pages to be presented on the second client device, wherein the one of the plurality of pages is determined as a function of a plurality of weighted factors, individual ones of the plurality of weighted factors corresponding to a measure of user interaction identified during the first session, at least a portion of the weighted factors comprising:
         a category of an item shown in a respective one of the plurality of pages relative to categories of other items having pages accessed in the first session;
         an amount of time spent on a respective one of the plurality of pages;
         a purchase or a lack of a purchase made of the item through the respective one of the pages; and
         a manipulation or a lack of a manipulation of at least one portion of the respective one of the pages during the first session;
      detect that the single selection was made on the second client device in association with the resume session component when the resume session component was shown; and
      in response to the single selection being made, cause the one of the plurality of pages to be presented on the second client device.

5. The system of claim 4, wherein at least one of the plurality of weighted factors corresponds to a time that the one of the plurality of pages was accessed.

6. The system of claim 4, further comprising program instructions that, when executed, cause the at least one computing device to determine that content on the one of the plurality of pages has changed since the first session.

7. The system of claim 6, further comprising program instructions that, when executed, cause the at least one computing device to generate an indicator that the one of the plurality of pages has changed for inclusion in the at least one user interface.

8. The system of claim 4, further comprising program instructions that, when executed, cause the at least one computing device to communicate a request for the one of the plurality of pages to the at least one computing device in response to the single selection being made on the second client device.

9. The system of claim 4, further comprising program instructions that, when executed, cause the at least one computing device to generate a list of at least a portion of the plurality of pages for inclusion in the at least one user interface, individual ones of the plurality of pages in the list being configured for selection in the at least one user interface.

10. The system of claim 9, wherein the list is generated to comprise a screen capture of the respective one of the plurality of pages shown in association with the respective one of the plurality of pages.

11. The system of claim 4, wherein the at least one of the plurality of pages is a product page for the item, the item being available for consumption through an electronic commerce application.

12. The system of claim 4, wherein the single selection is a single touch or a single click performed on the second client device.

13. A computer-implemented method for programmatically identifying a most-relevant network page from a past network site session to facilitate a return to the most-relevant network page on another device, comprising:
    maintaining, by at least one computing device having at least one hardware processor, a navigation history of a network site for a user account in memory, the navigation history comprising a plurality of product pages accessed by a first client device during a first electronic commerce session;
    detecting, by the at least one computing device, after the first electronic commerce session has been completed, that a second client device associated with the user account is accessing the network site during a second electronic commerce session;
    in response to the second client device accessing the network site during the second electronic commerce session, generating, by the at least one computing device, a resume component for inclusion in a first user interface shown on the second client device during the second session, the resume component being configured to, when manipulated using a single selection, resume the first electronic commerce session by presenting one of the plurality of product pages;
    identifying, by the at least one computing device, the one of the plurality of product pages to be presented on the second client device, wherein the one of the plurality of product pages is determined as a function of a plurality of weighted factors, individual ones of the plurality of weighted factors corresponding to a measure of user interaction identified during the first electronic commerce session, at least a portion of the weighted factors comprising:
        a category of an item shown in a respective one of the plurality of product pages relative to categories of other items having product pages accessed in the first electronic commerce session;
        an amount of time spent on the respective one of the plurality of product pages;
        a purchase or a lack of a purchase made of the item through the respective one of the product pages; and
        a manipulation or a lack of a manipulation of at least one portion of the respective one of the product pages during the first electronic commerce session; and
    causing, by the at least one computing device, the one of the plurality of product pages to be presented in a second user interface on the second client device in response to a single manipulation of the resume component performed on the second client device.

14. The computer-implemented method of claim 13, wherein at least one of the plurality of weighted factors corresponds to whether the one of the plurality of product pages is a most recently visited one of the plurality of product pages.

15. The computer-implemented method of claim 13, further comprising receiving, by the at least one computing device, a request for the resume component in response to the single selection being performed in association with the resume component on the second client device.

16. The computer-implemented method of claim 15, wherein the single selection of the resume component that causes the request to be communicated to the at least one computing device from the second client device is a single touch or a single click performed on the second client device.

17. The computer-implemented method of claim 13, further comprising:
    determining, by the at least one computing device, that content on the one of the plurality of product pages has changed since the first electronic commerce session; and
    generating, by the at least one computing device, an indicator that the one of the plurality of product pages has changed for inclusion in the one of the plurality of product pages, the indicator being generated in response to the content of the one of the plurality of product pages having changed since the first electronic commerce session.

18. The computer-implemented method of claim 13, wherein identifying the one of the plurality of product pages further comprises removing, by the at least one computing device, a subset of the plurality of product pages from consideration.

19. The computer-implemented method of claim 18, wherein the subset of the plurality of product pages is removed from consideration in response to the item associated with the at least one product page being identified as incapable of being accessed by the second client device.

20. The computer-implemented method of claim 13, further comprising generating, by the at least one computing device, a list of the plurality of product pages for inclusion in the first user interface, individual ones of the plurality of pages in the list being configured for selection in the first user interface.

* * * * *